(No Model.)
J. T. SIBLEY.
CAR COUPLING.
No. 268,739.                               Patented Dec. 5, 1882.
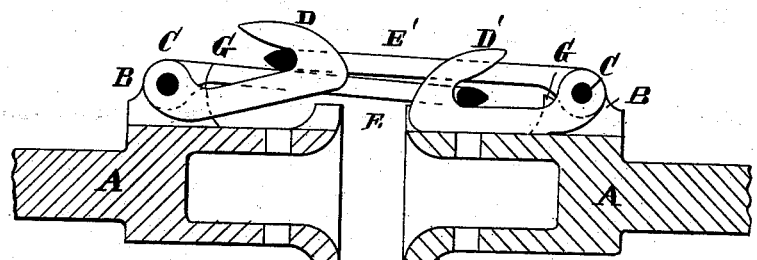
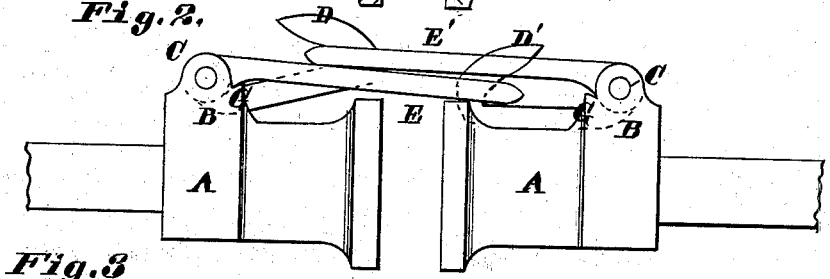
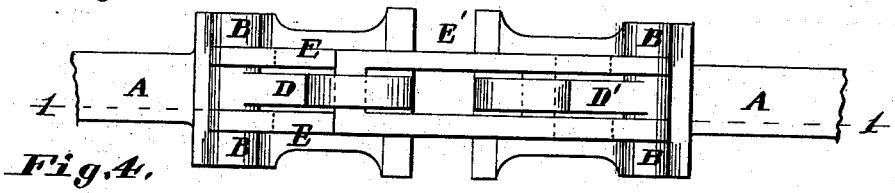
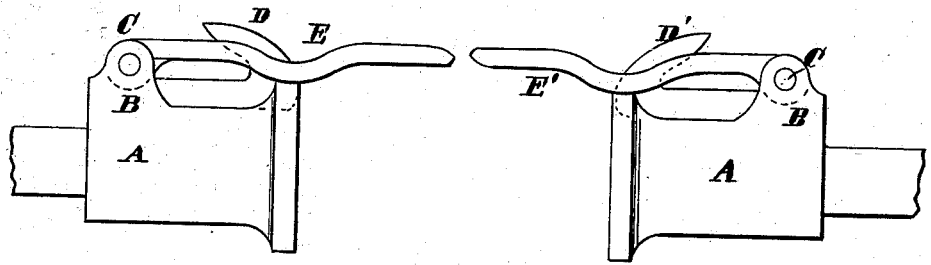
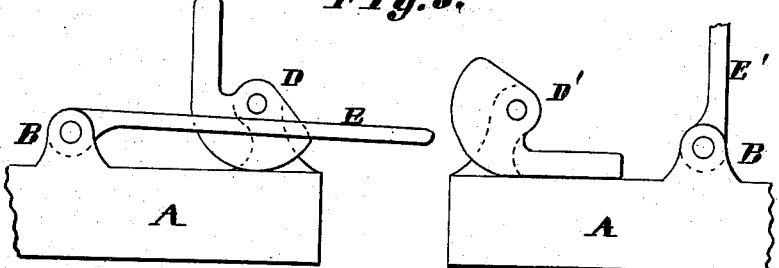
Attest:
Charles Pickles
W. J. Kesl.
Inventor,
Jno. T. Sibley
By Knight Bros

UNITED STATES PATENT OFFICE.

JOHN T. SIBLEY, OF ST. LOUIS, MISSOURI.

CAR-COUPLING.

SPECIFICATION forming part of Letters Patent No. 268,739, dated December 5, 1882.

Application filed August 16, 1882. (No model.)

*To all whom it may concern:*

Be it known that I, JOHN T. SIBLEY, of the city of St. Louis, in the State of Missouri, have invented a certain new and useful Improvement in Car-Couplings, of which the following is a full, clear, and exact description, reference being had to the accompanying drawings, forming part of this specification, and in which—

Figure 1 is a longitudinal section on line 1 1, Fig. 3. Fig. 2 is a side view. Fig. 3 is a top view. Fig. 4 is a modification in side view. Fig. 5 is a modification showing the manner of applying it to a passenger-car.

My invention consists in a hinged hook and a hinged link upon each of the draw-heads, the hooks projecting through both links when coupled, each link engaging the hook of the other draw-head as the cars come together. The links are preferably made with knife-edges at their outer ends, so that they cannot abut against each other as they come in contact, but will slide one over the other. The hooks are made with rearwardly-projecting inclined faces, forming guides, up which the ends of the lower links slip as the cars approach.

A A represent the two draw-heads, which may be of any desired construction. B B are ears or lugs formed on top of each draw-head, through which passes a pintle-bolt, C, forming the hinge of the hooks of the respective draw-heads. The hook of one of the draw-heads is lettered D and that of the other draw-head D'. In like manner, one of the links is lettered E and the other E'. I have shown the hooks and links connected to the draw-heads by the same pintle, C; but if desired they can be connected by different pintles. The outer ends of the links are sustained in or near a horizontal position when not coupled by projections G of the draw-heads, or by other suitable means. The outer ends of the links are preferably beveled or formed with knife-edges, as shown, so that they will not abut on coming together, but one will slide over the other. The outer edges of the hooks are inclined rearwardly, so that the points of the links slip up them and fall over the points or upper portions of the hooks as the cars approach. It will be seen that as the links slip past each other the upper one will be sustained by the lower one, and that the latter will first drop over its hook, making place for the descent of the other. Then as the cars are drawn apart the upper link will lift up the hook it engages with until they reach the same angle, (see Fig. 1;) and it will thus be seen that the hooks and links will accommodate themselves to the line of draft, whatever the relative height of the draw-heads may be. It will be also seen that the device allows the coupling of one of my draw-heads with one having the common coupling-pin.

The parts are always in position for coupling as the cars come together. In uncoupling, which can only be done when the coupling is slack, the links are simply lifted up and thrown back against the car-body or other abutment, and if they should remain in this position when the draw-heads come together they will be jerked down by the impingement, and the coupling will take place.

In Fig. 4 is shown another manner of supporting the links in a horizontal position, which consists in bending them downward from their pivots and then bending them up again, so that their ends are on a line with their pivots.

In Fig. 5 is shown a modification of the hooks to be used for passenger-cars, which consists in pivoting the hooks so that they can be put in one position, and when the links strike them they will fall over and take up the slack in the links. The left hand side of Fig. 5 shows one position and the right the other.

I claim as my invention—

1. A car-coupling consisting of draw-head A, formed with ears or lugs B B on top, pintle C, hook D, and link E, the hook and link being hinged to the ears or lugs by said pintle and resting on the draw-head, as set forth.

2. A car-coupling consisting of draw-heads A A, each provided with ears or lugs B B, pintle C, hook D, and link E, the said hook and link being hinged to the ears or lugs by said pintle, and each link embracing both hooks to permit one link to rest upon the other, as set forth.

JNO. T. SIBLEY.

Witnesses:
GEO. H. KNIGHT,
ALBERT G. FISH.